G. WINDLE.
Distance Instrument.
No. 22,598.
Patented Jan. 11, 1859
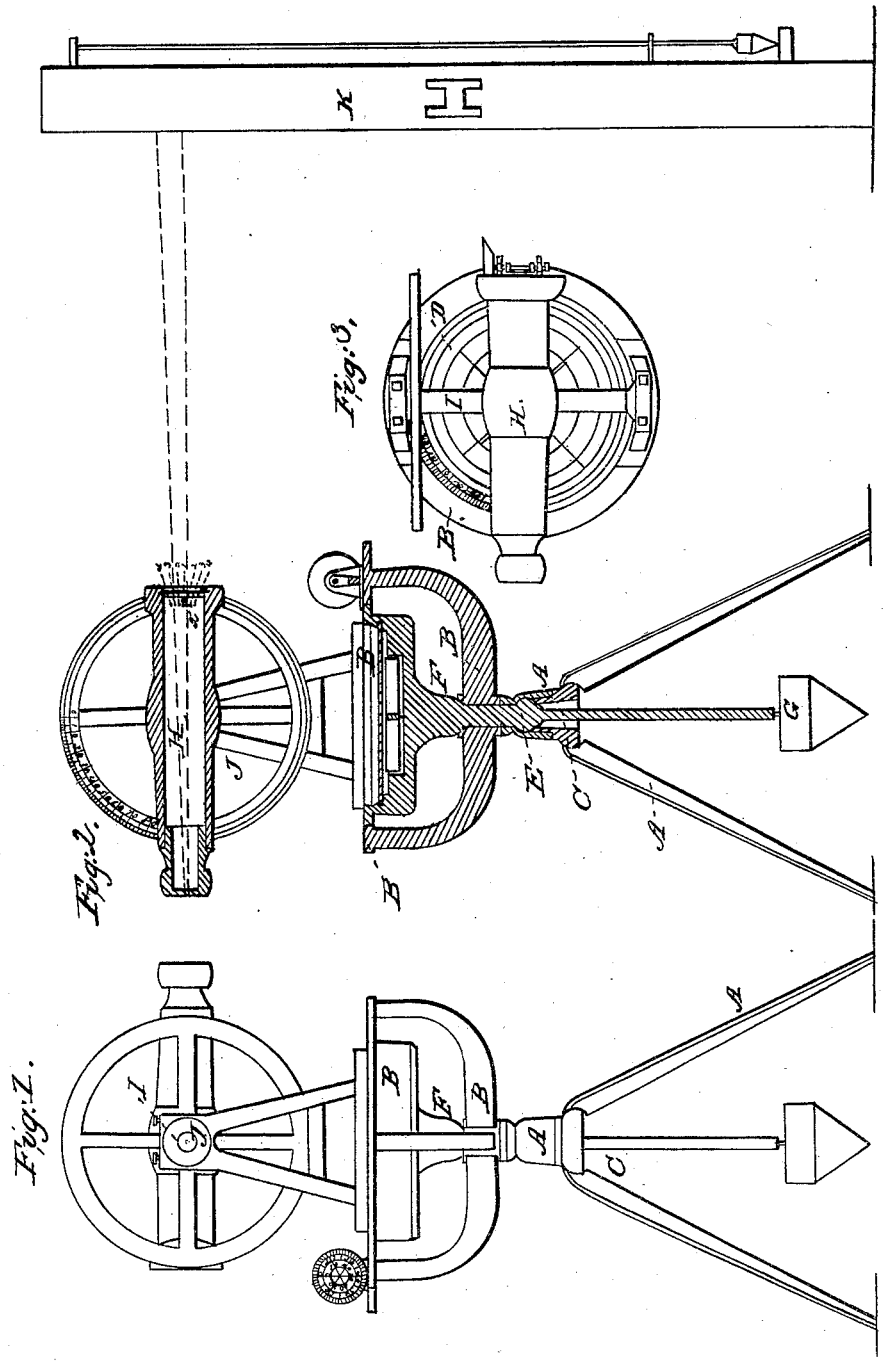

UNITED STATES PATENT OFFICE.

GEORGE WINDLE, OF EDINBURG, VIRGINIA.

SURVEYING INSTRUMENT.

Specification of Letters Patent No. 22,598, dated January 11, 1859.

*To all whom it may concern:*

Be it known that I, GEORGE WINDLE, of Edinburg, in the county of Shenandoah and State of Virginia, have invented a new and useful Improvement in Instruments for Leveling and Ascertaining Distances; and I do hereby declare that the following is a full, clear, and exact description of the same, reference being had to the accompanying drawings, forming part of this specification, in which—

Figure 1, is a side elevation of a surveying instrument with my improvements applied to it. Fig. 2, is a vertical, longitudinal section and Fig. 3, a plan of the same.

Similar letters of reference in each of the several figures indicate corresponding parts.

The nature of my invention consists in attaching the adjusting weight of the magnet case directly to the universal joint on which said case turns and swings; this arrangement greatly simplifying the instrument and admitting of the same having the usual adjustments in the path of a horizontal circle and also of adjusting itself at any point of its bearing, in the path of a vertical circle, as the necessity of the case may require.

My invention consists 2nd. In the arrangement of the pointer which designates the number of degrees at which the movable frame and telescope stand adjusted, on an adjusting screw which has the surface of its head graduated so as to indicate minutes, and which is used in connection with a stationary pointer and with an extension formed on the pointer which comes opposite the degrees on the magnet case. By this arrangement any minute in a degree may readily and accurately be indicated; for example, in case it is desired to have a bearing of $\frac{1}{20}$ degrees and $\frac{1}{40}$ minutes, all that has to be done is to first bring the scale of the magnet case round until the pointer stands in line with said number of degrees on the magnet case, then turn the minute screw head until $\frac{1}{40}$ minutes comes in line with the stationary pointer above alluded to. Thus turning the screw head causes the degree pointed to move the distance of $\frac{1}{40}$ minutes. The minutes being obtained, the frame must be moved until the pointer comes in line with the figures which designates $\frac{1}{20}$ degrees when you will have obtained what you desire, to wit; $\frac{1}{20}$ degrees and $\frac{1}{40}$ minutes. This method of obtaining the minutes avoids any inaccuracies and greatly facilitates the adjustment of the instrument for very nice measurements.

To enable others skilled in the art to make and use my invention, I will proceed to describe its construction and operation.

A, A, represents the standard which supports the instrument.

B, is a frame mounted on the upper end of the standard and fitted loosely round a vertical circular stem C, which projects downward from the index and magnet case D. Within this frame the index and magnet case is fitted loosely, being held from falling through or in position by a universal joint E, on which said case plays freely, and a shoulder F. By thus arranging the magnet and index case in a frame constructed below it instead of above it a full and unobstructed view of its glass face is secured. G, is a weight on the lower end of the stem C, of the magnet case. This weight has a tendency to keep the stem C, perpendicular, and the magnet case consequently is held in, or always instantly returned to, (in case of any shook) a horizontal position.

H, is the telescope of ordinary construction, and mounted as usual above the magnet and index case on a horizontal axis I, which is supported by pillar blocks J, J, of the frame B.

1, 2, represent the central, horizontal and perpendicular hair wires which are commonly employed for simply indicating the line of level on the staff K, 2, 3, 4, 2', 3', 4', designate the auxiliary hair wires which I employ in combination with the wires 1, 2, for ascertaining at the same time and by the same telescope both the line of level and the proportional distance between the staff and the instrument.

$m$, represents a screw for supporting and adjusting the pointer $n$, of the magnet scale $o$. The screw $m$, has its head $m'$, graduated so as to indicate the minutes of a degree whether it is turned to the right or left. The screw passes through two standards $p$, $p$, which are stationary with the movable frame B. The pointer $o$, is attached to the screw by means of a plate $q$, which has two ears $r$, $r$, through which the screw passes; said ears being screw tapped so that the plate moves back and forth independently of any lateral movement of the screw when the screw is turned. $s$, is a stationary pointer and $t$, is an extension of the degree pointer. $u$, is a guide mark for showing when the pointer is in proper position for starting. The screw is to be so constructed that by once turning it around the extent of just one degree will be traversed.

The advantage of having the head of the screw graduated in reverse directions as indicated at $v$, $w$, is this; the bearing can be had either way, that is either east or west. When the bearing is east it must be turned one way and if west, it must be turned the other way.

What I claim as my invention and desire to secure by Letters Patent, is—

1. Attaching the adjusting weight of the magnet case directly to the universal joint on which said case turns and swings, substantially as and for the purposes set forth.

2. The arrangement of the pointer which designates the number of degrees at which the movable frame and telescope stand adjusted, on an adjusting screw which has the surface of its head graduated so as to indicate minutes, in combination with a stationary pointer and with an extension formed on the pointer which comes opposite the degrees on the magnet case, substantially as and for the purposes set forth.

The above specification of my improvement in instruments for leveling and ascertaining distances signed by me this ninth day of June 1858.

GEORGE WINDLE.

Witnesses:
G. YORKE AT LEE,
J. R. HOPKINS.